(12) United States Patent
Blanche et al.

(10) Patent No.: US 8,325,402 B2
(45) Date of Patent: Dec. 4, 2012

(54) SYSTEM AND METHOD FOR SYNCHRONIZING A SPATIAL LIGHT MODULATOR WITH A PULSED LASER TO RECORD A HOLOGRAM AT THE REPETITION RATE OF THE PULSED LASER

(75) Inventors: Pierre-Alexandre Jean Blanche, Tucson, AZ (US); Arkady Bablumyan, San Diego, CA (US); Nasser N. Peyghambarian, Tucson, AZ (US)

(73) Assignees: TIPD, LLC, Tucson, AZ (US); The Arizona Board of Regents on Behalf of the University of Arizona, Tucson, AZ (US)

( * ) Notice: Subject to any disclaimer, the term of this patent is extended or adjusted under 35 U.S.C. 154(b) by 530 days.

(21) Appl. No.: 12/705,897

(22) Filed: Feb. 15, 2010

(65) Prior Publication Data

US 2011/0199658 A1 Aug. 18, 2011

(51) Int. Cl.
G02B 5/32 (2006.01)
(52) U.S. Cl. .......................................... 359/21; 359/35
(58) Field of Classification Search .................. None
See application file for complete search history.

(56) References Cited

U.S. PATENT DOCUMENTS

| | | | |
|---|---|---|---|
| 4,007,481 A * | 2/1977 | St. John | 348/41 |
| 6,806,982 B2 | 10/2004 | Newswanger | |
| 6,859,293 B2 | 2/2005 | Klug | |
| 7,027,197 B2 | 4/2006 | Newswanger | |
| 7,227,674 B2 | 6/2007 | Klug | |
| 7,357,513 B2 * | 4/2008 | Watson et al. | 353/31 |
| 7,364,306 B2 * | 4/2008 | Margulis | 353/31 |
| 7,505,186 B2 | 3/2009 | Newswanger | |
| 2004/0041744 A1 * | 3/2004 | Inoue et al. | 345/1.3 |

OTHER PUBLICATIONS

Oksana Ostroverkhova et al, Organic Photorefractives: Mechanisms, Materials and Applications, Chem Rev. 104, 3267-3314 Jun. 26, 2004.

M. Eralp et al, Submillisecond response of a photoreractive polymer under single nanosecond pulse exposure, Applied Physics Letters 89, 114105, Sep. 13, 2006.

* cited by examiner

Primary Examiner — Arnel C Lavarias
(74) Attorney, Agent, or Firm — Eric A. Gifford

(57) ABSTRACT

A system and method that synchronizes a spatial light modulator (SLM) with a pulsed laser to record a hologram at the repetition rate of the pulsed laser for applications including holographic displays and data storage. The color channel capability of a SLM is utilized to effectively increase the write throughput when the pulsed laser repetition rate LR exceeds the SLM's image refresh rate R. The hogels are encoded on the color channels and concatenated to form a sequence of color images such that the write throughput is equal to the repetition rate LR up to a maximum of N*R. This effectively extends the capability and continued viability of existing inexpensive SLMs.

19 Claims, 12 Drawing Sheets

$$(y_x-1)/(N*R) < (x-1)/LR + \text{offset} < y_x/(N*R) \quad \text{eqn. 1}$$

$$A_x + B_x/N = y_x/N \quad \text{eqn. 2}$$

SYSTEM AND METHOD FOR SYNCHRONIZING A SPATIAL LIGHT MODULATOR WITH A PULSED LASER TO RECORD A HOLOGRAM AT THE REPETITION RATE OF THE PULSED LASER

GOVERNMENT LICENSE RIGHTS

This invention was made with Government support under FA9550-07-1-0071 awarded by the Air Force Office of Scientific Research, under W31P4Q-07-0267 awarded by the US Army Aviation & Missile Command, and under FA9550-09-C-0015 awarded by the Air Force Office of Scientific Research. The Government has certain rights in this invention.

BACKGROUND OF THE INVENTION

1. Field of the Invention

This invention relates to recording holograms and, more particularly, to a system and method for synchronizing a spatial light modulator with the pulsed laser to record a hologram at the repetition rate of the pulsed laser for application including holographic displays and data storage.

2. Description of the Related Art

Holography is a technique that allows the light scattered from an object to be recorded and later reconstructed so that it appears as if the Object is in the same position relative to the recording medium as it was when recorded. Alternately, holograms can be computer generated by calculating the modulation pattern that would have been formed if beams with certain characteristics (wave front, intensity) would have crossed each other. The calculated pattern is next transferred to a medium to make the actual hologram. The image changes as the position and orientation of the viewing system change in exactly the same way as if the object were still present, thus making the recorded image (hologram) appears three-dimensional. The technique of holography can also be used to optically store, retrieve, and process information.

As shown in FIG. 1, when two coherent optical beams e.g. a reference beam 10 and an object beam 12 of finite beam width cross each other at a point in space, they interfere. The phase difference between the beams at each spatial location defines the intensity pattern. The recording of this intensity variation into a holographic recording material 14 as a phase and/or intensity modulation results in the formation of a hologram 16. The object beam may be scattered from the object or modulated with a spatial light modulator (SLM) based on computer-generated images to produce an image or to store information. The optical beams may be continuous wave (CW) or pulsed lasers. Typical holographic recording materials include silver halide emulsion films, photothermoplastics, photopolymers, photochromics material and photorefractive (PR) material, including polymers. To store large amounts of data or to write a 3D image by integral holography, a large number of holograms have to be recorded side-by-side. Each hologram is a holographic pixel (or hogel) of a larger frame.

SUMMARY OF THE INVENTION

The present invention provides a system and method for synchronizing a spatial light modulator (SLM) with the pulsed laser to record a hologram at the repetition rate of the pulsed laser for applications including holographic displays and data storage.

This is accomplished with a SLM that is configured to display N color channels 0, 1, ... N−1 of a color image in sequence as separate grey scale images at N times the SLM's image refresh rate R. A temporal mapping is created based on the pulse laser repetition rate LR and the SLM's image refresh rate R and number of color channels N so that each successive laser pulse coincides with each successive hogel. The computer-generated hogel grey scale images are encoded onto the appropriate color channels 0, 1, ... N−1 according to the temporal mapping to create hogel color channel images. Depending upon the ratio of repetition rate LR to image refresh rate R, the temporal mapping may skip one or more color channels between pulses. A placeholder hogel and image are mapped to these color channels that do not coincide with a pulse and encoded. The placeholder image may be any arbitrary image or, to reduce aliasing due to possible drift of the laser or SLM, may be the immediately preceding or succeeding hogel. If the pulse laser repetition rate exceeds N times the image refresh rate R, pulses that would otherwise write the same hogel twice may be inhibited so that each hogel is written with one and only one pulse. Successive groupings of N color channel images are concatenated in accordance with the temporal mapping to form a sequence of frames as color images at the SLM image refresh rate R. On average the color images include a number of hogels equal to a ratio of the repetition rate LR to the SLM image refresh rate R up to a maximum of N. This sequence may be generated offline and stored in memory or generated in real time. The sequence of color image is loaded into the SLM, which in turn modulates the pulsed object beam with the N color channels of the color image in sequence as separate grey scale images at N times the image refresh rate R. The modulated object beam and reference beam are steered relative to the holographic recording material to interfere at the material and write successive hogels at different locations on the material to record the hologram at the repetition rate LR of the pulsed laser up to N times the SLM image refresh rate R. Although treated as color channels to increase the throughput, the object beam is modulated with the grey scale values of the computer-generated hogel image associated with a particular color channel. The encoding and concatenation steps are performed to get the sequence of grey scale images determined by the temporal mapping into the proper color image format for the SLM.

In an embodiment, the creation of the temporal mapping of hogels to color channels so that each successive laser pulse coincides with each successive hogel comprises for each laser pulse x=1, 2, ... calculating a frame number $y_x$ that satisfies $(y_x-1)/(N*R) \leq (x-1)/LR + \text{offset} < y_x/(N*R)$ where offset is an offset of the first pulse relative to the start of the first frame and calculating $A_x + B_x/N = y_x/N$ where $A_x$ is the number of the color image in the sequence and $B_x$ is the number of the color channel within the color image that coincides with the $x^{th}$ pulse. The $x^{th}$ hogel grey scale image is encoded onto the $B_x$ color channel and placed in the sequence at frame number $y_x$. The $(y_x - y_{x-1}) - 1$ frames in the sequence between pulses x−1 and x that do not coincide with either pulse are mapped to a placeholder hogel having an associated placeholder grey scale image. The placeholder grey scale images encoded in sequence on the color channels between the $(x-1)^{th}$ and $x^{th}$ hogel color channel images and concatenated as successive groupings of N color channel images to form the sequence of frames as color images at the SLM image refresh rate R. If two pulses are mapped to the same frame one of the pulses may be inhibited so that each hogel is written with one and only one pulse.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a system and method for synchronizing a spatial light modulator with the pulsed laser to record a hologram at the repetition rate of the pulsed laser for application including holographic displays and data storage. The invention utilizes the color channel capability of a SLM to effectively increase the write throughput when the pulsed laser repetition rate LR exceeds the SLM's image refresh rate R. The hogels are encoded on the color channels and concatenated to form a sequence of color images in the color image format specified by the SLM such that the write throughput is equal to the repetition rate LR up to a maximum of N*R. The invention effectively extends the capability and continued viability of existing inexpensive SLMs.

Figure 1:
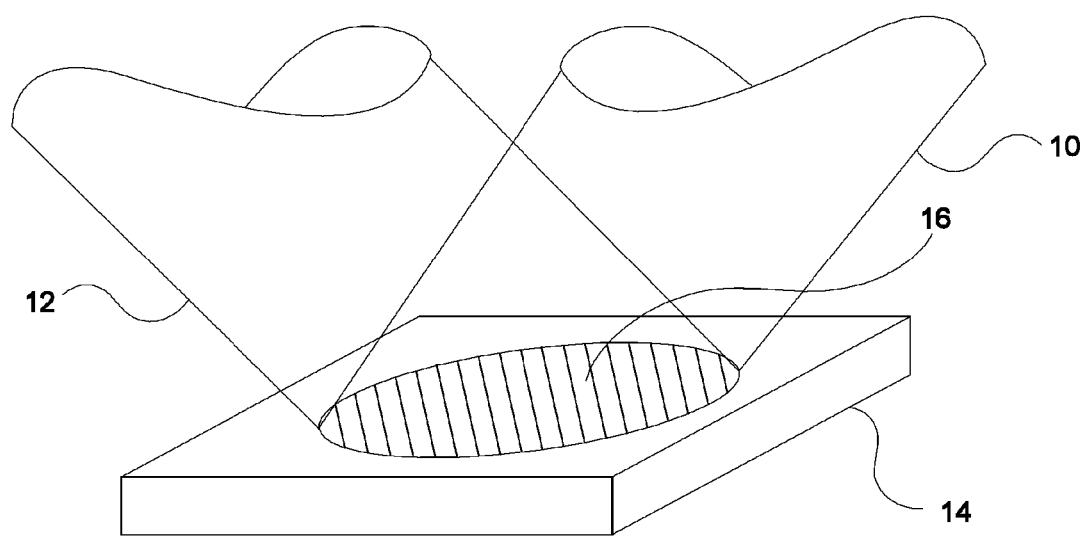
FIG. 1, as described above, illustrates the recording of hologram through the interference of an object beam with a reference beam on a holographic recording material.
Figure 2:
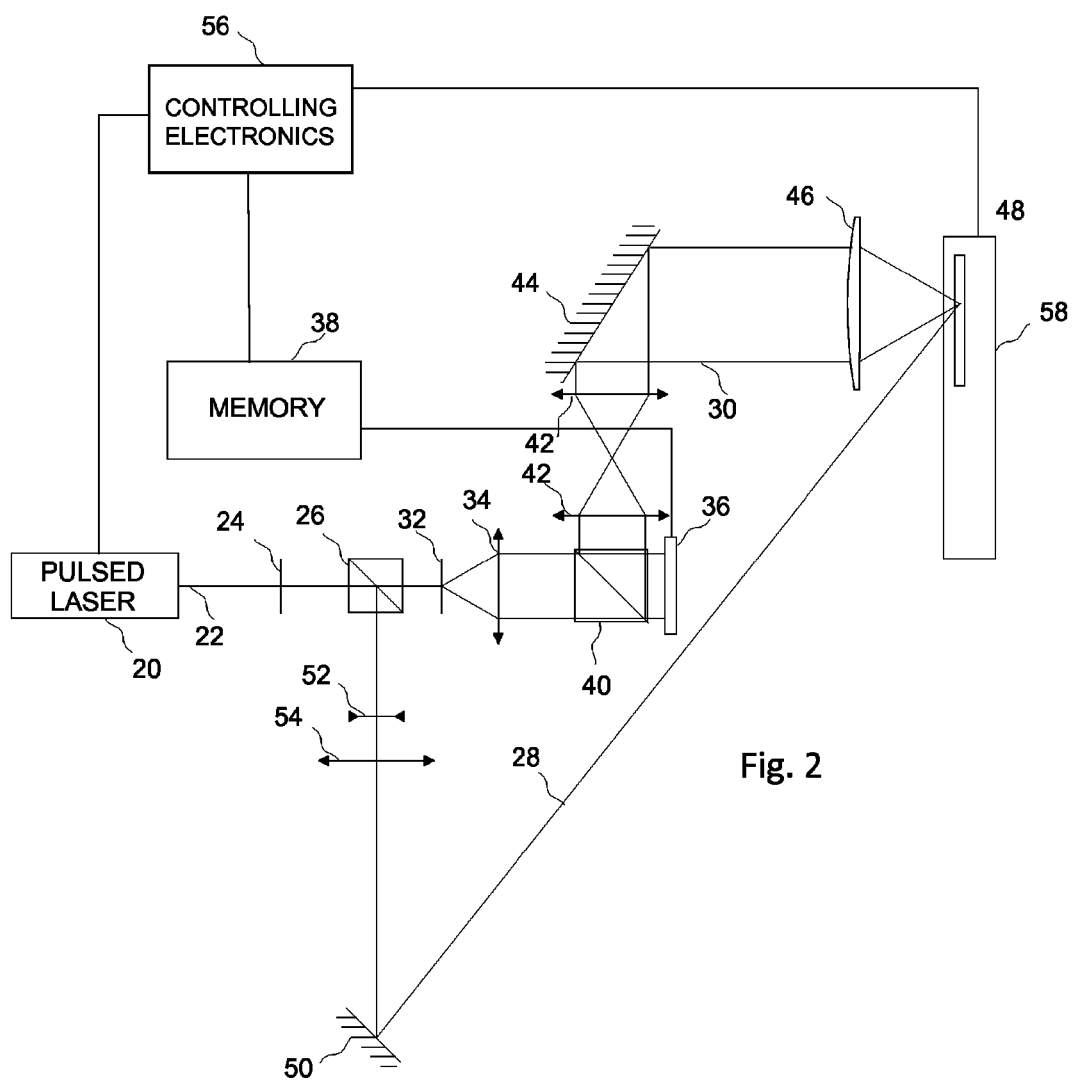
FIG. 2 is a diagram of an exemplary system for recording a hologram from computer-generated images using a pulsed laser and spatial light modulator (SLM)

An embodiment of a multiple hologram single-color recording setup is shown in FIG. 2. A pulsed laser light source 20 such as a frequency doubled Nd:YAG laser at 532 nm emits a linearly polarized coherent pulsed beam 22 that is directed through a half wave plate 24 to rotate the plane of polarization and a polarizer beam splitter 26 to separate the beam into a reference beam 28 and an object beam 30. A beam expander constituted of a diffuser 32 and a lens 34 expands the beam diameter to fit the size of a spatial light modulator (SLM) 36.

The SLM 36 (e.g. a reflective liquid crystal display) modulates the object beam intensity in accordance with the computer-generated images stored in memory 38 for the current hogel. The modulated object beam reflected from the SLM is reflected by a beam splitter cube 40 to another telescope comprising two lenses 42 that resize the beam. A mirror 44 directs the modulated object beam 30 to a lens 46 that focuses the object beam 30 onto the holographic recording material 48 at a given angle and location. Reference beam 28 is directed off mirror 50 to recording material 48 at a given angle. A telescope composed of two cylindrical lenses 52 and 54 enlarge the size of the reference beam to the size of the holographic pixel to be written.

Control electronics 56 (e.g. a computer) controls the spatial light modulator 36 by providing the image from memory 38, controls a steering mechanism such as multi-axis translation stage 58 to position the recording material for writing and controls pulsed laser 20 to trigger a pulse and release the laser light. In an alternate embodiment, a steering mechanism may steer the object and reference beams.

To write a sequence of hogels on the recording material, the material is moved relative to the spot at which the object and reference beams interfere to the first hogel position. The first image is loaded from memory 38 into the SLM 36. A laser pulse 22 is triggered to write the first hogel into the recording material. The material is moved to the second hogel position. The second image is loaded from memory into the SLM and the laser pulse is triggered to write the second hogel into the sample and so on up to the last hogel.

The illustrated embodiment uses a transmission hologram geometry in which the two writing beams address the recording device from the same side. The reading beam goes through the device to read the hologram. In an alternate embodiment, a reflective hologram geometry can be used in which the writing beams address the device from opposite sides. In this case, the reading beam is diffracted back to the same side of the sample as the light source. The reflection geometry has the advantages that a polychromatic light source such as ambient light can be used for reading and the field of view can be larger since there is no need to reserve some of the solid angle for the writing beam which comes from the opposite side. The drawbacks are that writing must be done at the same color as the hologram should be displayed, imposing strong constraints on the laser source.

Typical holographic recording materials include silver halide emulsion films, photothermoplastics, photopolymers, photochromics material and photorefractive (PR) material, including polymers. PR polymers may be of particular interest as they combine both memory required for persistence of the hologram and the capability to be updated. hi PR polymers, a three-dimensional refractive index pattern —a phase hologram—replicates the non-uniform interference pattern formed by the two incident coherent light fields. This effect is based on the build-up of an internal space-charge field due to selective transport and trapping of the photo-generated charges, and an electric field induced index change via the electro-optic effect. This process—in contrast to photochemical processes involved in photopolyiner holograms—is fully reversible, as trapped charges can be de-trapped by uniform illumination. The erasability of the PR gratings allows for refreshing/updating of the holograms. In a typical PR material the holograms are viewed with the help of a reading beam, as long as the initial writing (recording) beams are present. When the writing beams are turned off, the PR hologram decays at a rate determined by the material properties and ambient temperature.

For simplicity the embodiment of the 3D hologram was presented for a single color display. Multi-color reflection holograms may be constructed by superimposing or interlacing different holograms written at different colors (red, green, and blue, for example). This requires different laser lines/ sources. The overall hologram is read by using a white light source. Each individual hologram is wavelength selective and only diffracts one color (the one it was written with). The viewer sees the superimposition i.e. white or any other color depending upon the relative powers of the reading beams and the eye's spectral response. Multi-color transmission holograms are made by writing different holograms (one per color, superimposed or interlacing) at different angles (angle multiplexing). There is no need to change the writing source. By taking advantage of the angular selectivity during reading, one can use different reading monochrome sources placed at different angles. Each source (red, green, blue) replays one different hologram and the viewer see the superposition (white or other colors).

Although continuous wave (CW) lasers could be used to record these holograms, pulsed lasers are more appropriate. Nanosecond pulsed lasers deliver a large amount of energy in a very brief pulse sufficient to write each hogel with a single pulse. So brief that the interferogram is insensitive to the ambient noise: mechanical vibration, thermal expansion, or air turbulence are too slow to influence the fringe pattern. It has to be noted that the hogel has to be written with a single pulse to fully benefit from this desensitization. If more than one pulse is used, there is a chance that the interferogram from one pulse will not match the one from the previous pulse and partially erase the grating, reducing the diffraction efficiency.

In the case of a CW laser, the recording speed of the hologram is determined by the laser power and the sensitivity of the material. The time for recording one hologram is given by the material sensitivity divided by the laser power. In the case of pulsed laser, providing the laser power is enough to record a hologram with a single pulse, the recording speed is given by the laser repletion rate: the rate at which the laser can emit successive pulses. Pulsed laser technology has recently evolved so the repetition rate is now challenging or surpassing the spatial light modulator image refresh rate. Conventional techniques limit write throughput at the SLM image refresh rate R.

The repetition rate of the pulsed laser is the maximum frequency at which the laser can deliver successive pulses. Most of the lasers useful for holographic recording use a flash lamp technology. In this technology, a flash lamp is used to pump the laser media at a constant repetition rate. That rate is not widely adjustable and the laser light pulse can only be triggered at an integer divider of the fundamental frequency. As an example, a 100 Hz repetition rate laser can only be triggered at 100 Hz, 50 Hz, 33.33 Hz, 25 Hz, 20 Hz . . .

A careful synchronization between the laser repetition rate LR, the spatial light modulator refreshing rate R and the scanning mechanism (e.g. translation stage and/or beam steering mechanism) is needed to optimize the recording time. Indeed, the laser pulse needs to arrive at the spatial light modulator location when the image (hogel data) is fully loaded. Then, the modulated laser pulse needs to arrive at the material position when the scanning mechanism is right at the correct position to write the holographic pixel (hogel).

Figure 3:
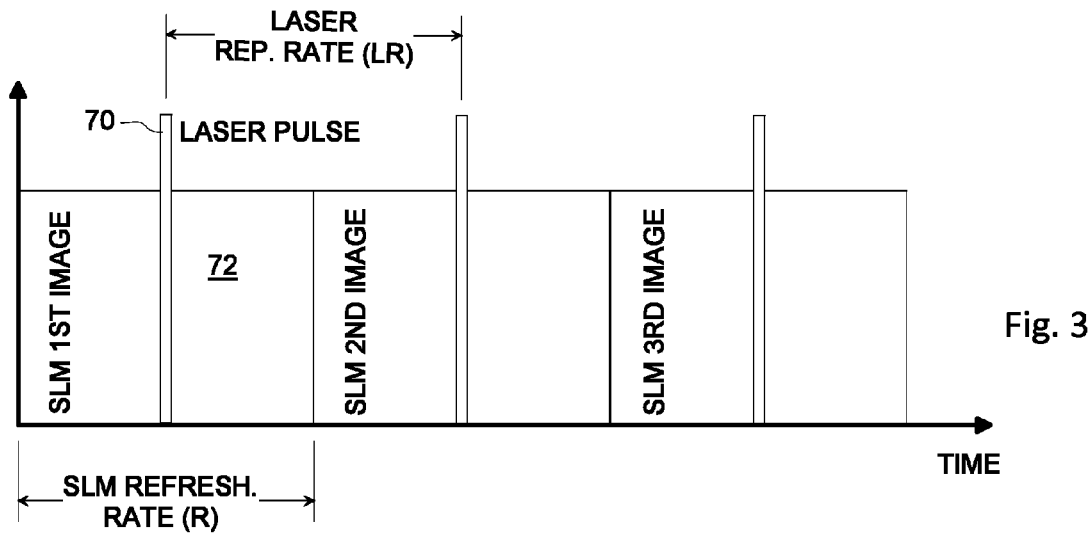
FIG. 3 is a diagram illustrating the synchronization of the SLM with a pulsed laser when the SLM's image refresh rate and pulse laser's repetition rates are compatible.
Figure 4:
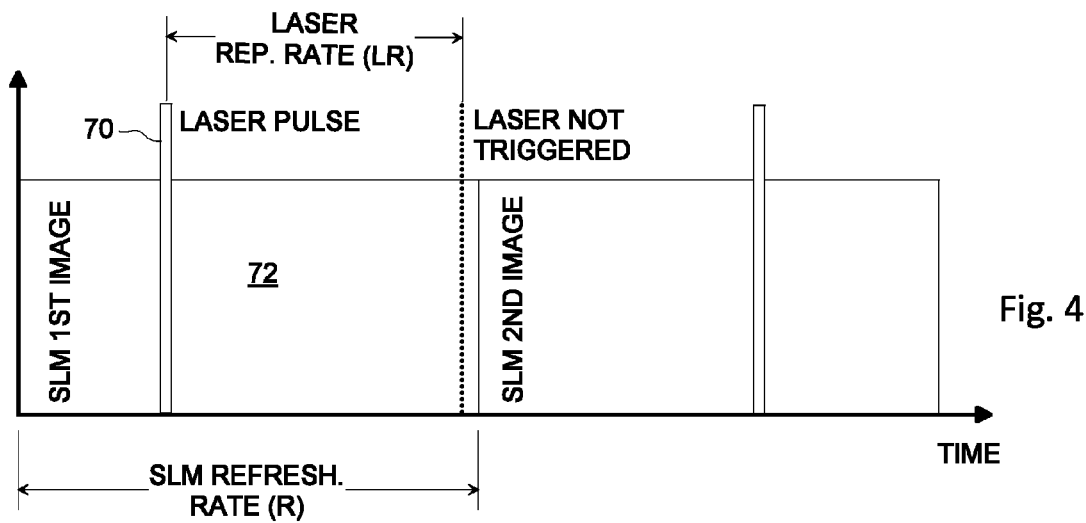
FIG. 4 is a diagram illustrating the synchronization of the SLM with a pulsed laser when the repetition rate exceeds the image refresh rate by selectively inhibiting pulses to record the hologram at the image refresh rate.
Figure 5:
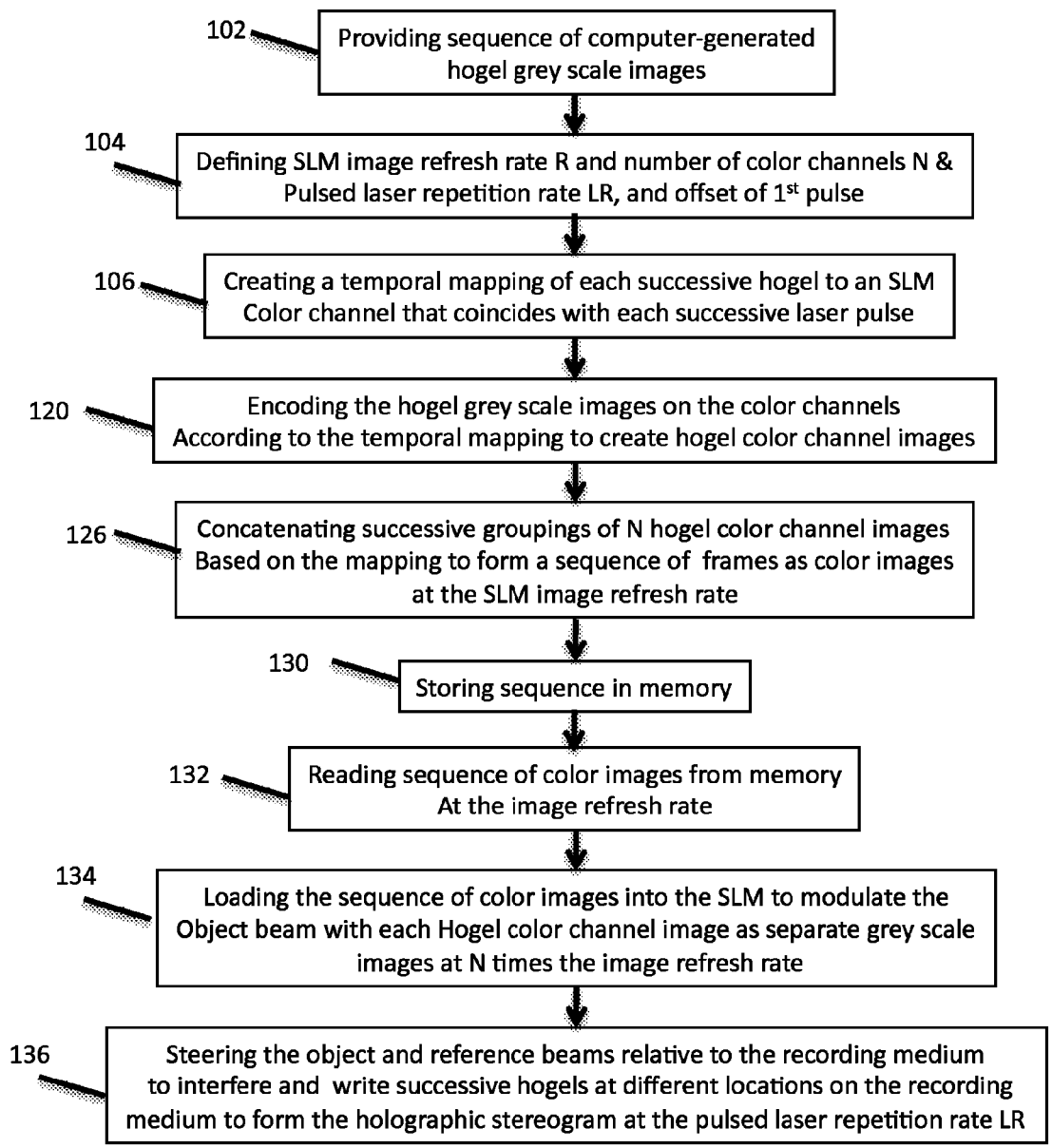
FIG. 5 is a flow diagram in accordance with the present invention illustrating the synchronization of the SLM with a pulsed laser when the repetition rate exceeds the image refresh rate by mapping laser pulses to SLM color channels to record the hologram at the pulse laser repetition rate.
Figure 6A:
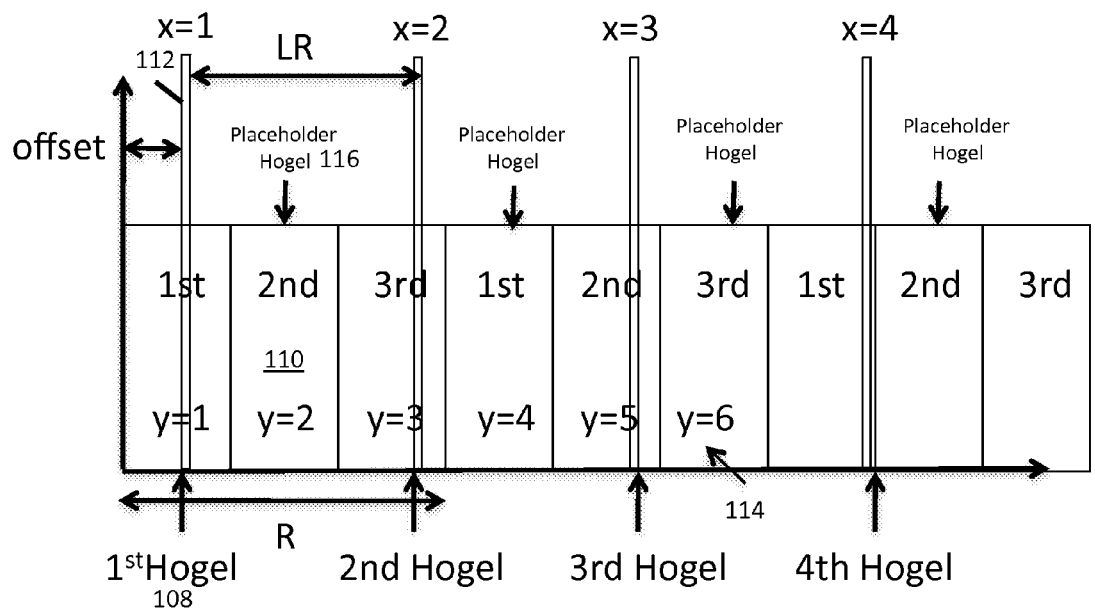
FIGS. 6a through 6c are respectively diagrams illustrating a temporal mapping of hogels to color channels so that each successive laser pulse coincides with each successive hogel, encoding of the hogel images on the assigned color channels and concatenation of N encoded images to form a color image.
Figure 6B:
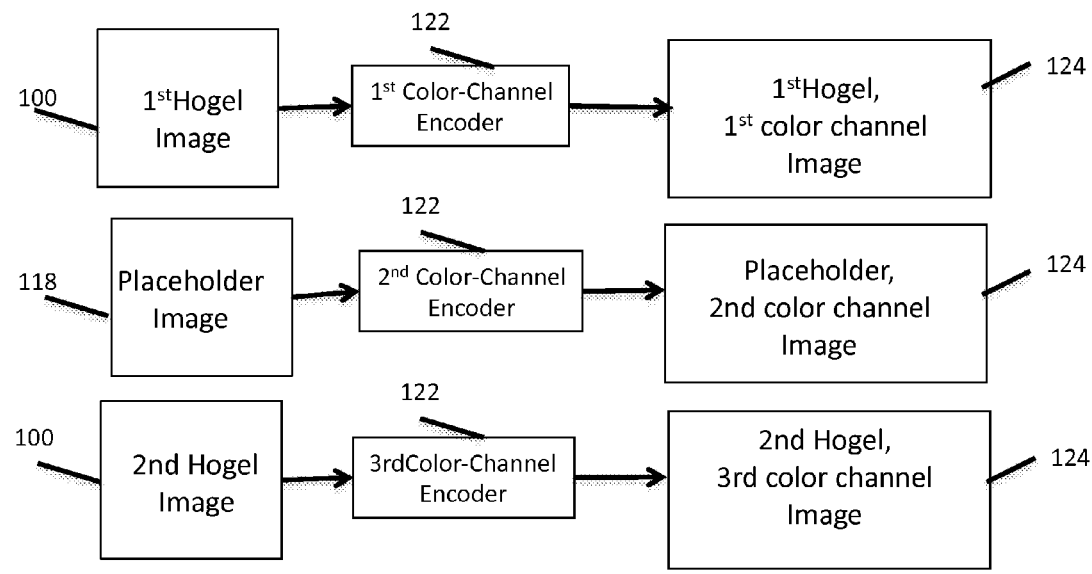
Figure 6C:
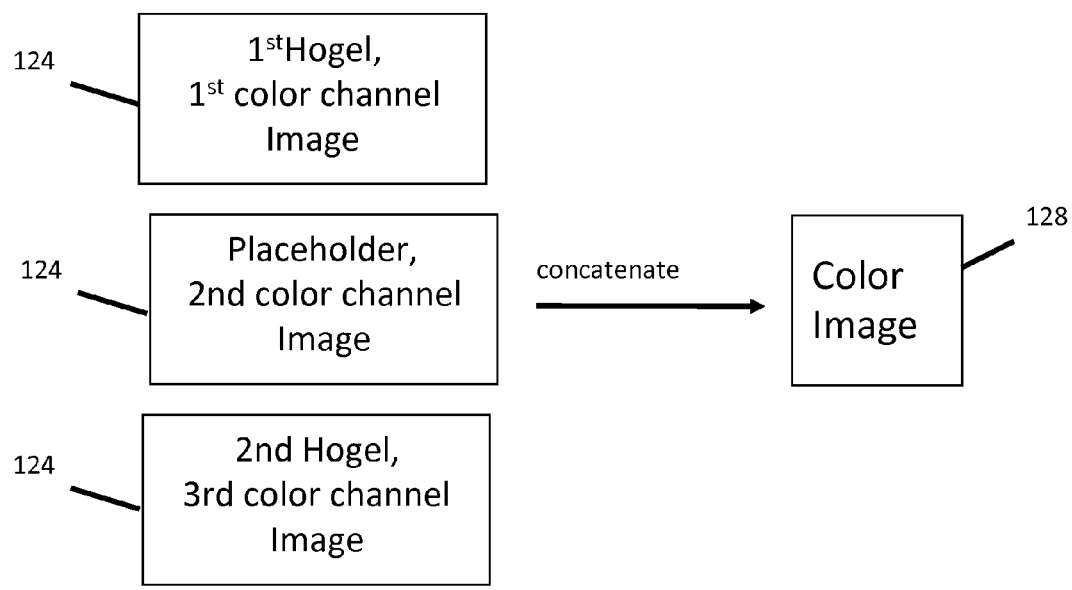

The direct approach to synchronize the laser and the SLM is to trigger the laser pulse 70 once the image 72 has been loaded to the SLM as it is shown FIG. 3. However, the refreshing rate R of the SLM and the repetition rate LR of the laser are not necessarily compatible. Usually, but not necessarily, SLM are tuned to the video frequency of 60 Hz and pulsed laser are multiple of 25 Hz (25, 50, 100 . . . ). In the case of a pulsed laser with frequency LR above the SLM refreshing rate R, the later becomes the limiting factor of the recording speed. Furthermore, since the triggering of the laser can only be done at an integer divider of the fundamental frequency, the operative rate of the system can be dramatically reduced due to the mismatch between those frequencies as illustrated by FIG. 4. As a numerical example, a setup with a 60 Hz SLM and a 70 Hz laser can only be operated at 35 Hz (70/2) which is a serious limitation. Alternately, duplicative pulses may be selectively not triggered. A setup with a 60 Hz SLM and a 70 Hz laser would have a write throughput of 60 Hz (i.e. the image refresh rate of the SLM).

As pulsed laser technology continues to advance to faster repetition rates LR and the desire to increase write throughput grows the limitation imposed by the SLM image refresh rate becomes more problematic. One option may be to design and build SLM with the same technology but capable of higher image refresh rates R. Although technically possible the practicality of this approach is limited. The market for SLMs is driven by conventional display applications that have no or limited need for higher refresh rates. SLMs designed only for holographic applications would face a limited market and would be quite expensive. Another option would be to replace conventional SLM technology with a MEMS device, which exhibit kHz bandwidths. See N. Savage, "Digital spatial light modulator", Nature Photonics, vol, 3, p, 170, March 2009, for an example of a MEMs device that could be used to overcome this limitation. The use of a MEMs device is a good technical solution to the problem, but currently is considerably more expensive than existing SLMs. Moreover, MEM's are binary devices: the micro mirrors can only be on or off where the SLM is capable of displaying grey scale, improving the hogel resolution.

The present invention increases write throughput using currently available SLM technology. More specifically the maximum throughput is increased from the SLM image refresh rate R to N times R where N is the number of color-channels supported by the SLM. We take advantage of the way many SLMs are configured to display multi-color images to increase the throughput to write single-color (grey scale) images to form holograms.

A typical SLM (e.g. a liquid crystal device) displays only grey scale and does not have the native capability to display color. Color images are treated as 3 separate grey scale images for each color channel, e.g. red, green and blue (RGB) or cyan, magenta, yellow and black (CMYB). Each SLM has a specified format for a colored image. For example the color image may be the combination of 3 matrices, one for each color. An SLM having an image refresh rate of R=60 Hz displays the three color channels as separate grey scale images in sequence at 180 Hz (3×60 Hz). To display color, a color wheel is synchronized to the SLM so that the red channel is coincident with the red portion of the color wheel and so forth. The human eye integrates the temporal sequence of R, G, B to see a colored image.

When used to write hogels, the computer-generated images in existing systems are loaded into the SLM as a color image and the pulsed object beam is modulated at the image refresh rate R. We exploit the color-channel capability of the SLM to effectively increase the refresh rate. In the case of RGB SLMs the refresh rate, hence the maximum throughput triples. For other types of SLMs, for example an SLM configured to modulate images at 10 different IR bands (colors) may be used to increase the effective throughput 10 times. In general, our approach allows the write throughput to be dictated by the pulse repetition rate LR (>R) up to a maximum of N*R. In order to exploit the SLM color-channel capability, we must derive a temporal mapping based on LR, R and N for each hogel to a color channel that will coincide with next laser pulse, encode the hogel images on the color channels according to the mapping and concatenate groupings of N color channel images based on the mapping to form a sequence of frames as color images. Encoding and concatenation are performed to put the sequence of grey scale images determined by the temporal mapping into the proper color image format for the SLM. The SLM then modulates the pulse according to the grey scale values in the computer-generated hogel image for each color channel.

Referring now to FIGS. 5 and 6a through 6c, in an embodiment a SLM is configured to display N color channels 0, 1, ... N−1 of a color image in sequence as separate grey scale images at N times the SLM's image refresh rate R. A sequence of computer-generated hogel grey scale images 100 is provided 102. The SLM image refresh rate R and number of color channels N and the pulsed laser repetition rate LR and the offset of the first laser pulse are defined 104 for the recording setup. A temporal mapping is created 106 from hogels 108 to color channels 110 based on the pulse laser repetition rate LR and offset and the SLM's image refresh rate R and number of color channels N so that each successive laser pulse 112 coincides with each successive hogel 108. For each laser pulse x=1, 2, . . . the temporal mapping may calculate a frame number $y_x$ 114 that satisfies $(y_x-1)/(N*R) < (x-1)/LR + \text{offset} < y_x/(N*R)$ (eqn. 1) where offset is an offset of the first pulse relative to the start of the first frame and may calculate $A_x + B_x/N = y_x/N$ (eqn. 2) where $A_x$ is the number of the color image in the sequence and $B_x$ is the number of the color channel within the color image that coincides with the $x^{th}$ pulse (and $x^{th}$ hogel). The $(y_x - y_{x-1})-1$ frames in the sequence between pulses x−1 and x that do not coincide with either pulse are mapped to a placeholder hogel 116 having an associated placeholder grey scale image 118. The placeholder image may be any arbitrary image or, to reduce aliasing due to possible drift of the laser or SLM, may be the immediately preceding or succeeding hogel. The occurrence of placeholder hogels will depend on the ratio of LR to R. If two pulses are mapped to the same frame one of the pulses may be inhibited so that each hogel is written with one and only one pulse. This may occur when the pulse laser repetition rate exceeds N times the SLM image refresh rate R.

The computer-generated hogel grey scale images and any placeholder images are encoded 120 using, for example, color-channel encoders 122 onto the appropriate color channels 0, 1, ... N−1 according to the temporal mapping to create hogel color channel images 124. More specifically, the $x^{th}$ hogel grey scale image is encoded onto the $B_x$ color channel and placed in the sequence at frame number $y_x$. The placeholder grey scale images are encoded in sequence on the color channels between the $(x-1)^{th}$ and $x^{th}$ hogel color channel images.

The nature of the encoding is dictated by color representation and specific format of a particular SLM. Each color channel encoder 122 is configured to convert a hogel grey scale image into its color-channel format. Typically, each grey scale image is a single two-dimensional matrix in which each pixel is assigned a value. For example, an 8-bit representation would assign values between 1 and 256 to each pixel. The matrix is encoded to say red, green or blue. The encoding may also be depending on the image format e.g. jpeg, gif, BMP etc and contain a header.

Successive groupings of N color channel images are concatenated 126 in accordance with the temporal mapping to form a sequence of frames as color images 128 at the SLM image refresh rate R. For example, an RGB format may be a three-dimensional matrix in which each pixel has 8 bits of red, 8 bits of green and 8 bits of blue. In a grouping, the first 8-bit grey scale image is encoded to red, the second image is encoded to green and the third image is encoded to blue. The 8 bits for each color component for each pixel are then concatenated to form the 3D matrix for the color image. On average the color images include a number of hogels equal to a ratio of the repetition rate LR to the SLM image refresh rate R up to a maximum of N. This sequence may be generated offline and stored in memory 130 or generated in real time.

The sequence of color images is read from memory 132 at the image refresh rate R and loaded into the SLM, which in turn modulates 134 the pulsed object beam with the N color channels of the color image in sequence as separate grey scale images at N times the image refresh rate R. Following on with the example for the RGB format, the modulator reads the $1^{st}$ 8-bits for every pixel to modulate the $1^{st}$ color channel, reads the $2^{nd}$ 8-bits for every pixel to modulate the $2^{nd}$ color channel, reads the $3^{rd}$ 8-bits for every pixel to modulate the $3^{rd}$ color channel and then repeats as the color images are loaded at the refresh rate R. Although the SLM continues to operate at its refresh rate R the effective throughput to modulate the object beam is N=3 times the refresh rate R. Although treated as color channels to increase the throughput, the object beam is modulated with the grey scale values of the computer-generated hogel image associated with a particular color channel. The encoding and concatenation steps are performed to get the sequence of grey scale images determined by the temporal mapping into the proper color image format for the SLM.

The modulated object beam and reference beam are steered 136 relative to the holographic recording material to interfere at the material and write successive hogels at different locations on the material to record the hologram at the repetition rate LR of the pulsed laser up to N times the SLM image refresh rate R.

Without loss of generality, the temporal mapping will be illustrated for various ratios of LR/R ranging from 1<LR/R to N<LR/R for a RGB (N=3) SLM in FIGS. 7 through 11. Each case applies the general equations:

$$(y_x-1)/(N*R) < (x-1)/LR + \text{offset} < y_x/(N*R) \quad \text{(eqn. 1)}$$

$$A_x + B_x/N = y_x/N \quad \text{(eqn. 2)}$$

to determine the mapping for each hogel/pulse to the appropriate frame and color channel. In this example, the preceding hogel is used as the placeholder hogel.

Example SLM Color Image Formats

Each hogel is a grey scale image. The grey scale is encoded on several bits (8 bits=256 grey variations). A grey scale image is a matrix. On a color image, each pixel is a vector that contains several values, each one for a specific color (3 for RGB, 4 for CMYB). A color image is a three dimension tensor. By knowing the format the SLM is using, we can encode on average more than one hogel into one single colored image.

As an example for RGB and one hogel per channel, the first hogel matrix is transformed (encoded) into a color formatted image so each pixel vector has its first value equal to the grey scale value, and the two other value of the vector are zero. The second hogel image is transformed into another colored image so each vector pixel has its first and last value equal to zero, and its second value equal to the grey scale value of the initial hogel. The third hogel image will be transformed into another colored image so each vector pixel has its first and second value equal to zero, and its third value equal to the grey scale value of the initial hogel. Then the three colored images (which are matrices) are added together (concatenated) to give the final colored image.

Yet another possibility is to directly attribute each pixel value of the first grey scale hogel to the first place of a colored image vector, each pixel value of the second grey scale hogel to the second place of the same colored image vector, and finally each pixel value of the third grey scale hogel to the third place of the same colored image vector. This forms the final colored image. In this case the definition of a three dimensional tensor containing three number vectors is the encoding step. The three pixel values are then concatenated into the three dimensional tensor.

For either approach if the mapping did not attribute any hogel image to the specific channel of the colored image, the value of that vector place can be set to a placeholder value (typically zero is used or a value from a preceding or succeeding hogel image) for each pixel.

Cases for RGB SLM

Case 1: 1<LR/R<1.5×R

Figure 7:
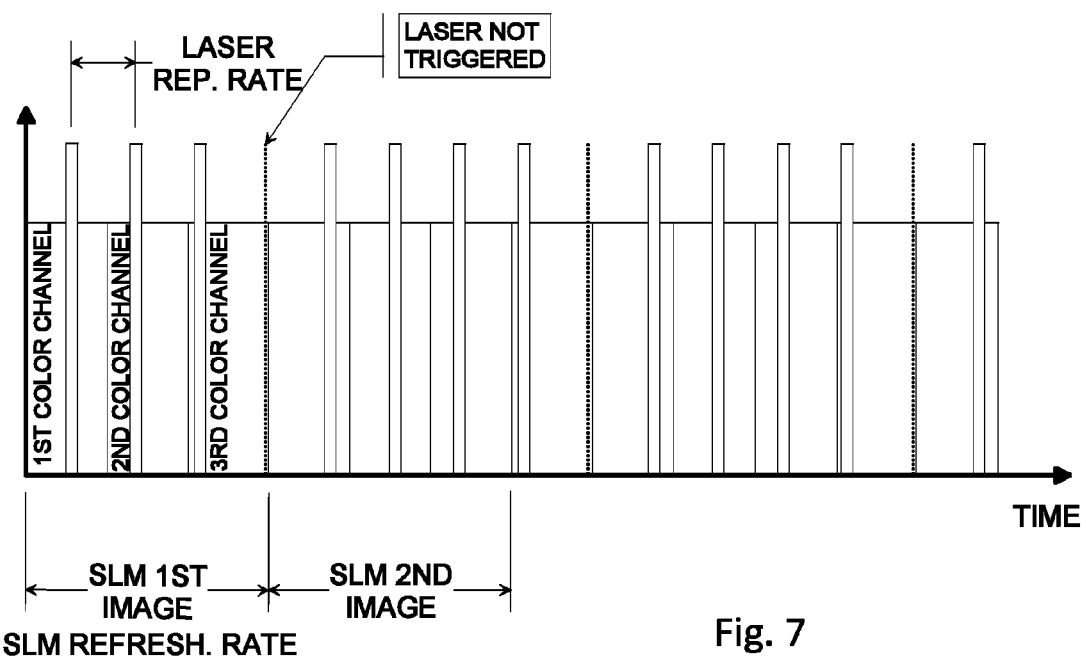
FIGS. 7 through 10 are diagrams illustrating the temporal mapping for a 3-color channel SLM for different ratios of repetition rate to image refresh rate.

As shown in FIG. 7 the pulsed laser repetition rate LR is 1 to 1.5 times the SLM refresh rate. At these rates there is at least one and possibly two placeholder hogels between each mapped hogel. At a ratio of 1 there would be exactly two placeholders between each hogel and at a ratio of 1.5 there would be exactly one. As shown, the preceding hogel is used as the placeholder hogel until the next hogel is assigned. On average, each color image includes LR/R hogels. Thus, operating the SLM at a refresh rate of R for each image produces a throughput of LR.

Case 2: LR/R=1.5×R

Figure 8:
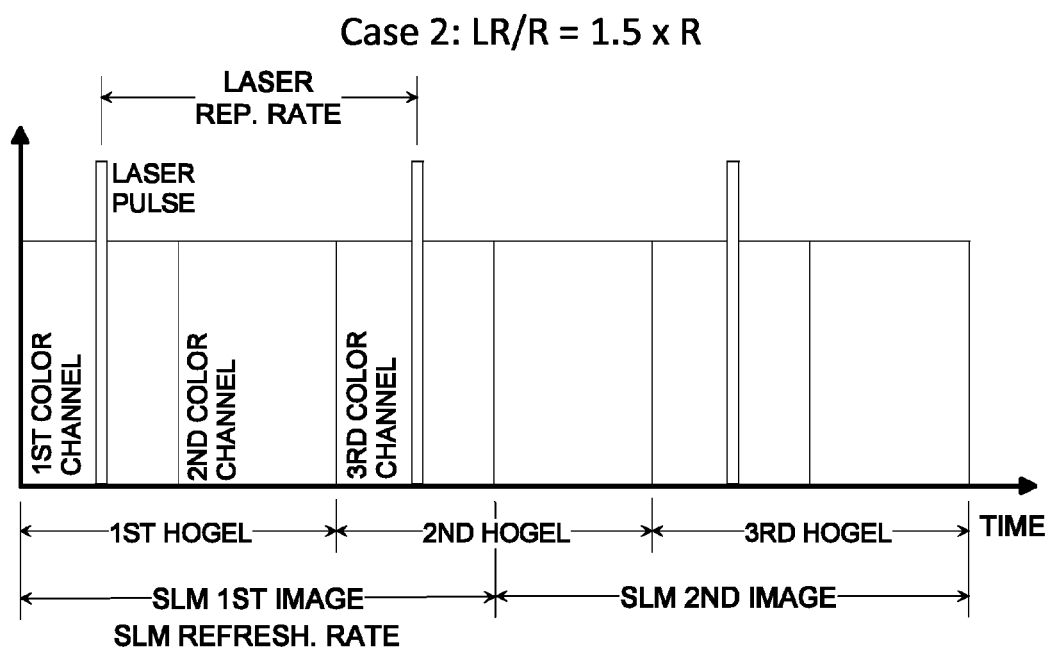

As shown in FIG. 8 the pulsed laser repetition rate LR is 1.5 times the SLM refresh rate. At this rate, each successive hogel maps to every other color channel with exactly one placeholder between. Again the preceding hogel is used as the placeholder On average each color image carries information for 1.5 hogels. The write throughput equals the repetition rate of LR=1.5R.

Case 3: 1.5<LR/R<3×R

Figure 9:
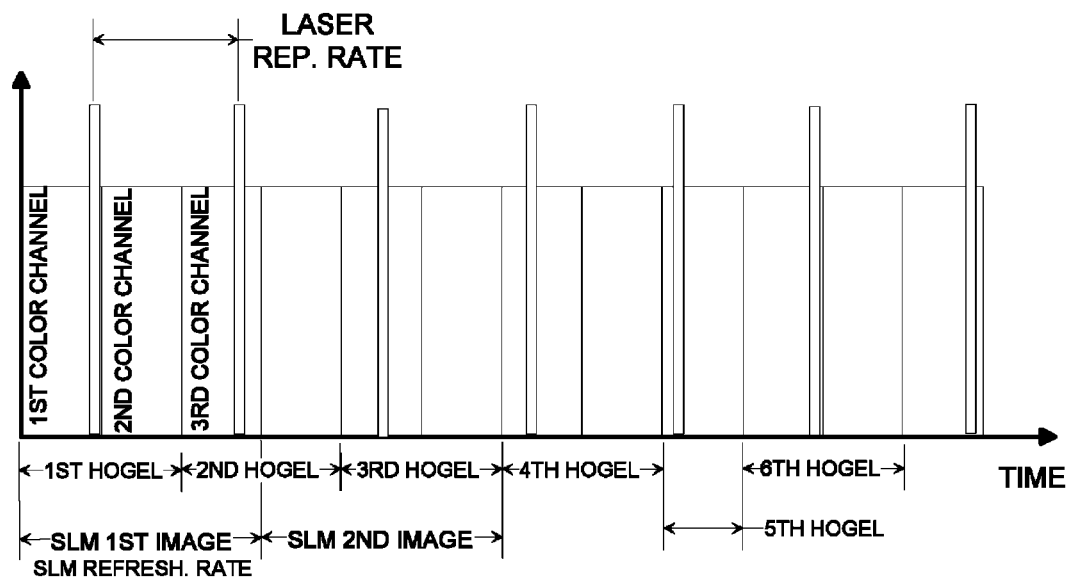

As shown in FIG. 9 the pulsed laser repetition rate LR is 1.5 to 3 times the SLM refresh rate. At these rates there is at most one placeholder hogels between each mapped hogel. At a ratio of 1.5 there would be exactly one placeholder between each hogel and at a ratio of 3 there would be none. As shown, the preceding hogel is used as the placeholder hogel until the next hogel is assigned. On average, each color image includes LR/R hogels. Thus, operating the SLM at a refresh rate of R for each image produces a throughput of LR.

Case 4: LR/R=3×R

Figure 11:
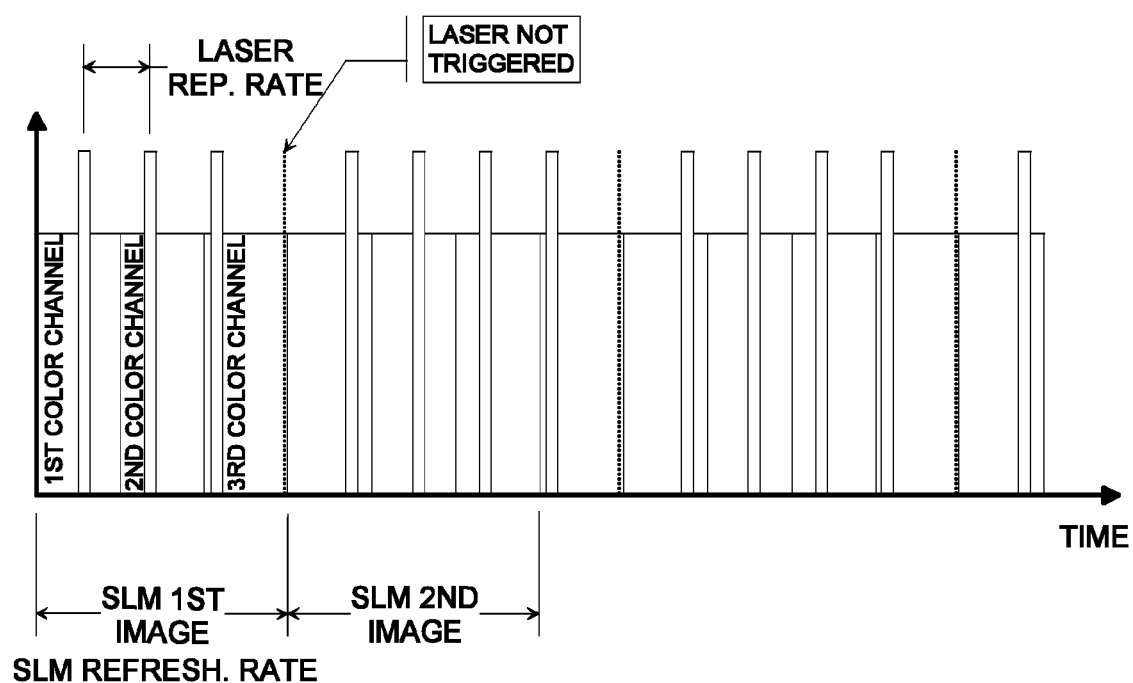
FIG. 11 is a diagram illustrating the temporal mapping for a 3-color channel SLM in which the repetition rate exceeds 3 times the image refresh rate.

As shown in FIG. 11 the pulsed laser repetition rate LR is 3 times the SLM refresh rate. At this rate, each successive hogel maps to each successive color channel with no placeholders. Each color image carries information for 3 hogels. The write throughput equals the repetition rate of LR=3×R.

Case 5: LR/R>3×R

Figure 10:
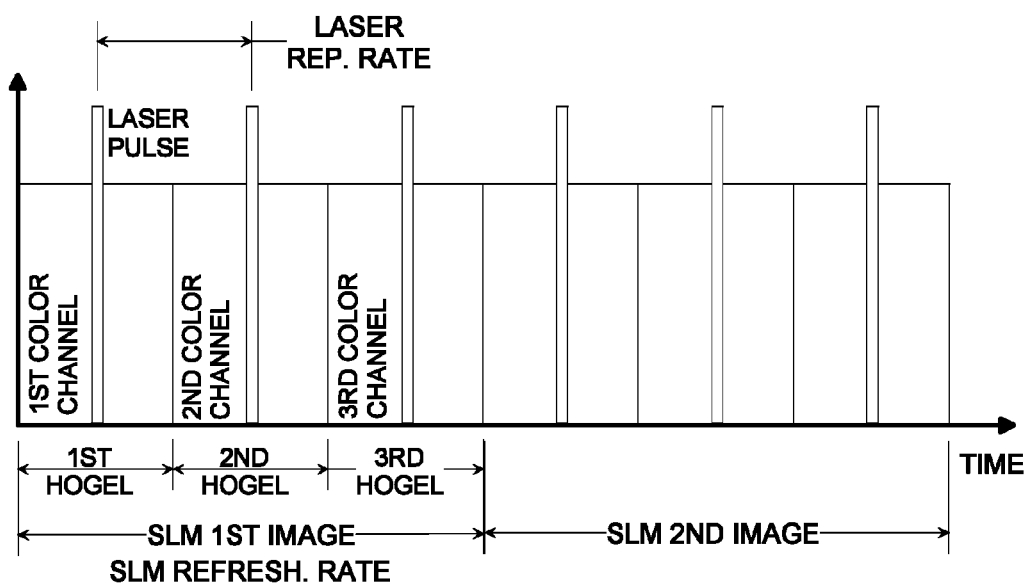

As shown in FIG. 10 the pulsed laser repetition rate LR>3 times the SLM refresh rate. At this rate, each successive hogel maps to each successive color channel with no placeholders. Each color image carries information for 3 hogels. The write throughput equals 3×R. Occasionally multiple pulses are mapped to the same hogel/color channel. In this case, the second laser pulse is not triggered.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of synchronizing a spatial light modulator (SLM) with a pulsed laser to record a hologram on a holographic recording material, said SLM configured to display N color channels 0,1, ... N−1 of a color image in sequence at N times the SLM's image refresh rate where N is an integer of two or more, said pulsed laser producing a coherent pulsed beam at a repetition rate (LR) above the SLM image refresh rate (R), comprising:

providing a computer-generated grey scale image for each of a plurality of hogels to record the hologram;

creating a temporal mapping of hogels to color channels based on pulse laser repetition rate LR, SLM image refresh rate R and the number of color channels N so that each successive laser pulse coincides with each successive hogel;

encoding the hogel grey scale images on the color channels 0,1, ... N−1 according to the temporal mapping to create hogel color channel images;

concatenating successive groupings of N color channel images in accordance with said mapping to form a sequence of frames as color images at the SLM image refresh rate R;

splitting the coherent pulsed beam into an object beam and a reference beam;

loading the sequence of color images into the SLM at the image refresh rate R, said SLM modulating the object beam with N color channels of the color image as separate grey scale images in sequence at N times the image refresh rate R; and steering the modulated object beam and the reference beam relative to the holographic recording material to interfere at the material and write successive hogels at different locations on the material to record the hologram at the repetition rate LR of the pulsed laser up to N times the SLM image refresh rate R.

2. The method of claim 1, wherein for repetition rates up to N times the SLM image refresh rate R, each and every pulse is triggered and writes a different hogel on the holographic recording material, for repetition rates greater than N times the SLM image refresh rate R, pulses are selectively inhibited so that each hogel is written with one and only one pulse.

3. The method of claim 1, wherein frames that do not coincide with a laser pulse are mapped to either an immediately preceding hogel or an immediately succeeding hogel.

4. The method of claim 1, wherein frames that do not coincide with a laser pulse are mapped to a placeholder hogel having an associated placeholder grey scale image.

5. The method of claim 1, wherein the steps of creating the mapping and concatenating successive groupings of N hogel images to form the sequence of color images are performed offline, further comprising:

storing the sequence of color images in memory offline; and reading the sequence of color images from memory to load the images into the SLM.

6. The method of claim 1, wherein the steps of creating the mapping and concatenating successive groupings of N hogel images to form the sequence of color images are performed in real time to load the images into the SLM.

7. The method of claim 1, wherein the SLM is configured to display N=three Red, Green and Blue channels, said hogel grey scale images encoding on Red, Green and Blue channels in accordance with the temporal mapping.

8. The method of claim 1, wherein creating the temporal mapping of hogels to color channels so that each successive laser pulse coincides with each successive hogel comprises for each laser pulse x=1, 2, ... :

calculating a frame number $y_x$ that satisfies $(y_x-1)/(N*R) < (x-1)/LR + \text{offset} < y_x/(N*R)$ where offset is an offset of a first pulse relative to the start of the first frame; and calculating $A_x+B_x/N=y_x/N$ where $A_x$ is the number of the color image in the sequence and $B_x$ is the number of the color channel within the color image that coincides with the xth pulse, wherein the $x^{th}$ hogel grey scale image is encoded onto the $B_x$ color channel and placed in the sequence at frame number $y_x$.

9. The method of claim 8, wherein the $(y_x-y_{x-1})-1$ frames in the sequence between pulses x-1 and x that do not coincide with either pulse are mapped to a placeholder hogel having an associated placeholder grey scale image, said placeholder grey scale images encoded in sequence on the color channels between the $(x-1)^{th}$ and $x^{th}$ hogel color channel images and concatenated as successive groupings of N color channel images to form the sequence of frames as color images at the SLM image refresh rate R.

10. The method of claim 9, wherein the placeholder hogel corresponds to either an immediately preceding, hogel or an immediately succeeding hogel.

11. The method of claim 8, wherein if two pulses are mapped to a same frame one of the pulses is inhibited so that each hogel is written with one and only one pulse.

12. The method of claim 1, wherein the holographic recording material comprises a photorefractive polymer.

13. A method of generating sequence of color images to synchronize a spatial light modulator (SLM) with a pulsed laser to record a hologram on a holographic recording material, said SLM configured to display N color channels 0, 1, ..., N-1 of a color image as separate grey scale images in sequence at N times the SLM's image refresh rate (R) where N is an integer of 2 or more, said pulsed laser producing a coherent pulsed beam at a repetition rate (LR) above the SLM image refresh rate, comprising:

providing a computer-generated grey scale image for each of a plurality of hogels to record the hologram;

creating a temporal mapping of hogels to color channels 0, 1, ..., N-1 based on pulse laser repetition rate LR, SLM image refresh rate R and the number of color channels N so that each successive laser pulse coincides with each successive hogel;

encoding the hogel grey scale images on the color channels 0, 1, ..., N-1 according to the temporal mapping to create hogel color channel images;

concatenating successive groupings of N color channel images in accordance with said mapping to form a sequence of frames as color images at the SLM image refresh rate R, said color images on average including a number of hogels equal to a ratio of the repetition rate LR to the SLM image refresh rate R up to a maximum of N; and storing the sequence of frames in a memory for recording the hologram at the repetition rate LR of the pulsed laser up to N times the SLM image refresh rate R.

14. The method of claim 13, wherein creating the temporal mapping of hogels to color channels so that each successive laser pulse coincides with each successive hogel comprises for each laser pulse x=1, 2, ...:

calculating a frame number $y_x$ that satisfies $(y_x-1)/(N*R) \le (x-1)/LR+offset < y_x/(N*R)$ where offset is an offset of a first pulse relative to the start of the first frame; and calculating $A_x+B_x/N=y_x/N$ where $A_x$ is the number of the color image in the sequence and $B_x$ is the number of the color channel within the color image that coincides with the xth pulse, wherein the $x^{th}$ hogel grey scale image is encoded onto the $B_x$ color channel and placed in the sequence at frame number $y_x$.

15. The method of claim 14, wherein $(y_x-y_{x-1})-1$ frames in the sequence between pulses x-1 and x that do not coincide with either pulse are mapped to a placeholder hogel having an associated placeholder grey scale image, said placeholder grey scale images encoded in sequence on the color channels between $(x-1)^{th}$ and $x^{th}$ hogel color channel images and concatenated as successive groupings of N color channel images to form the sequence at frames as color images at the SLM image refresh rate R.

16. An apparatus for recording a hologram on a holographic recording material, comprising:

a holographic recording material:

a spatial light modulator (SLM) configured to display N color channels 0, 1, ..., N-1 of a color image in sequence at N times the SLM's image refresh rate (R);

a pulsed light source that produces a coherent beam at a repetition rate (LR) above the SLM image refresh rate (R);

a beam splitter that splits the coherent beam into an object beam and a reference beam;

a memory that stores a sequence of frames as color images, said sequence formed as a concatenation of successive groupings of N hogel color channel images in accordance with a temporal mapping based on pulse laser repetition rate LR, SLM image refresh rate R and the number of color channels N so that each successive laser pulse will coincide with each successive hogel, each hogel color channel image comprising a computer-generated grey scale image encoded on a particular color channel according to the mapping;

a controller that reads the sequence of color images from memory and loads them into the SLM at the image refresh rate R, said SLM modulating the object beam with the hogel color channels images of the color image as separate grey scale images in sequence at N times the image refresh rate R; and a mechanism that steers the modulated object beam and the reference beam relative to the holographic recording material to interfere at the material and write successive hogels at different locations on the material to record the hologram at the repetition rate LR of the pulsed laser up to N times the SLM image refresh rate R.

17. The apparatus of claim 16, wherein the temporal mapping of hogels to color channels to form said sequence so that each successive laser pulse coincides with each successive hogel satisfies conditions for each laser pulse x=1, 2, ... in which:

a frame number $y_x$ satisfies $(y_x-1)/(N*R) \le (x-1)/LR+offset < y_x/(N*R)$ where offset is an offset of a first pulse relative to the start of the fast frame; and $A_x+B_x/N=y_x/N$ where $A_x$ is the number of the color image in the sequence and $B_x$ is the number of the color channel within the color image that coincides with the xth pulse, wherein the $x^{th}$ hogel grey scale image is encoded onto the $B_x$ color channel and placed in the sequence at frame number $y_x$.

18. The apparatus of claim 17, wherein the $(y_x-y_{x-1})-1$ frames in the sequence between pulses x-1 and x that do not coincide with either pulse are mapped to a placeholder hogel having an associated placeholder grey scale image, said placebolder grey scale images encoded in sequence on the color channels between the $(x-1)^{th}$ and $x^{th}$ hogel color channel images and concatenated as successive groupings of N color channel images to form the sequence of frames as color images at the SLIM image refresh rate R.

19. The method of claim 17, wherein if two pulses are mapped to a same frame one of the pulses is inhibited so that each hogel is written with one and only one pulse.

* * * * *